(12) United States Patent
Yamashita (10) Patent No.: US 6,573,684 B2
(45) Date of Patent: Jun. 3, 2003

(54) BATTERY STORAGE CASE (75) Inventor: Kenichiro Yamashita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 09/862,053

(22) Filed: May 21, 2001

(65) Prior Publication Data
US 2002/0043956 A1 Apr. 18, 2002

(30) Foreign Application Priority Data

May 23, 2000 (JP) .................................. 2000-151478
May 23, 2000 (JP) .................................. 2000-151479

(51) Int. Cl.[7] ................................................ H02J 7/00
(52) U.S. Cl. ..................................................... 320/112
(58) Field of Search ................................ 320/112, 107, 320/110; 429/96, 99, 100, 149, 151, 153; 307/150; D13/103, 107

(56) References Cited

U.S. PATENT DOCUMENTS 5,212,020 A * 5/1993 Inobe ........................... 429/96
5,686,811 A * 11/1997 Bushong et al. ............ 320/110
6,014,009 A * 1/2000 Wierzbicki et al. ......... 320/107

* cited by examiner

Primary Examiner—Michael Sherry
Assistant Examiner—Pia Tibbits
(74) Attorney, Agent, or Firm—Robin, Blecker & Daley

(57) ABSTRACT

There is provided a battery storage case which is capable of accommodating batteries of different selected types without an unused space being left in a battery storage case thereof and is therefore very convenient to handle by users. A receiving section receives a plurality of AA battery cells that provide a predetermined voltage. A battery cover closes the receiving section. The receiving section has a space for accommodating the plurality of AA battery cells. The space has a first part for accommodating a smaller number of lithium battery cells than a number of the AA battery batteries, that provide the predetermined voltage, and a second part that is not used when the AA battery cells are received in the receiving section, the second part being used for accommodating spare batteries for the lithium battery cells.

6 Claims, 9 Drawing Sheets

BATTERY STORAGE CASE

BACKGROUND OF THE INVENTION

1. Field of the Invention

This invention relates to improvements in or to a battery storage case that can accommodate batteries of different types.

2. Related Background Art

Most of recent devices which use batteries, such as cameras, employ high-capacity lithium batteries. Although it is desirable for users to use lithium batteries which have excellent characteristics as batteries, conventional AA alkaline cells are also preferred by many users, e.g. for use with cameras which are often carried to various places, because of their availability and inexpensiveness. To meet such needs, there has been proposed e.g. by Japanese Laid-Open Patent Publication (Kokai) No. 9-43672, a power source pack (referred to as a "power source magazine" in the publication) for use with a single-lens reflex camera, which enables the use of AA batteries in the camera. This power source pack constitutes a battery storage case that cannot only accommodate AA batteries but also a lithium battery pack containing two lithium battery cells.

As is also understood, e.g. from the above publication, the lithium battery requires a far smaller space for accommodation than the AA battery to obtain the same output voltage. Therefore, in the battery storage case configured such that it can accommodate batteries of these selected two types, if the lithium battery is accommodated in the battery storage case, the accommodating space has a greater part of unoccupied space.

Further, besides the lithium battery and the AA battery, there are a lot of types of batteries which are different in shape and the like. Therefore, a battery storage case capable of accommodating batteries of specific different selected types has been proposed for the convenience of users, e.g. by Japanese Utility Model Publication (Kokoku) No. 5-32932.

According to the prior art publications, batteries of selected types that can be accommodated in the battery storage case are limited to a combination of a plurality of electric cell batteries and a battery pack, both occupying approximately the same space. However, the output voltage of an AA battery cell and that of a lithium battery cell are different from each other. For instance, in a camera normally operated at a rated voltage of 6 volts, two lithium battery cells can replace four AA battery cells required for the rated voltage. Further, the lithium battery in general is larger in external diameter and smaller in whole length than the AA battery. Therefore, it has been very difficult to configure a battery storage case that can accommodate batteries of the above two types as selected types.

SUMMARY OF THE INVENTION

It is an object of the invention to provide a battery storage case which is capable of accommodating batteries of different selected types without an unused space being left in a battery storage case thereof and is therefore very convenient to handle by users.

To attain the above object, according to a first aspect of the invention, there is provided a battery storage case comprising a) a receiving section for receiving a plurality of first batteries that provide a predetermined voltage; and b) a battery cover for closing the receiving section: and the receiving section has a space for accommodating the plurality of first batteries, the space having a first part for accommodating a smaller number of second batteries than a number of the first batteries, that provide the predetermined voltage, and a second part that is not used when the second batteries are received in the receiving section, the second part being used for accommodating spare batteries for the second batteries.

According to this battery storage case, a receiving section receives a plurality of first batteries that provide a predetermined voltage, and a battery cover closes the receiving section. The receiving section has a space for accommodating the plurality of first batteries. A first part of the space accommodates a smaller number of second batteries than a number of the first batteries, to provide the predetermined voltage, and a second part of the same is not used when the second batteries are received in the receiving section, and accommodates spare batteries for the second batteries. Therefore, it is possible to provide a battery storage case which is not only capable of making use of an unused space but also is very convenient for the user.

Preferably, the spare batteries have outer shells, and the battery cover has inner curved surfaces for holding the outer shells of the spare batteries.

Preferably, the battery storage case further comprises movable terminals that are moveable into a position in which the movable terminals are positioned inside the receiving section, to hold the second batteries in contact therewith when the second batteries are received in the receiving section.

To attain the above object, according to a second aspect of the invention, there is provided a battery storage case comprising a receiving section for receiving a plurality of first batteries, the receiving section having a space for accommodating the plurality of first batteries, the space having a part for accommodating second batteries shorter in whole length than the first batteries; and movable terminals that are moveable into a first position in which the movable terminals are receded outside the receiving section when the first batteries are received in the receiving portion, and into a second position in which the moveable terminals are positioned inside the receiving portion to hold the second batteries in contact therewith when the second batteries are received in the receiving section.

Preferably, the battery storage case further comprises a pivotally movable terminal base to which the movable terminals are attached, and a stage connected to the terminal base and extending longitudinally of batteries received in the receiving section, at least the terminal base and the stage forming a translation link mechanism allowing the stage to perform a translation in a direction radial of the received batteries when the terminal base is pivotally moved to bring the movable terminals into the first position for permitting the first batteries to be received in the receiving section or to bring the movable terminals into the second position for permitting the second batteries to be received in the receiving section.

More preferably, the first batteries and the second batteries have outer shells, and wherein the stage has first surfaces formed thereon for being brought into contact with the outer shells of the first batteries when the movable terminals are in the first position, and second surfaces formed thereon for being brought into contact with the outer shells of the second batteries when the movable terminals are in the second position.

The above and other objects, features, and advantages of the invention will become more apparent from the following detailed description taken in conjunction with the accompanying drawings.

DESCRIPTION OF THE PREFERRED EMBODIMENTS

Figure 1:
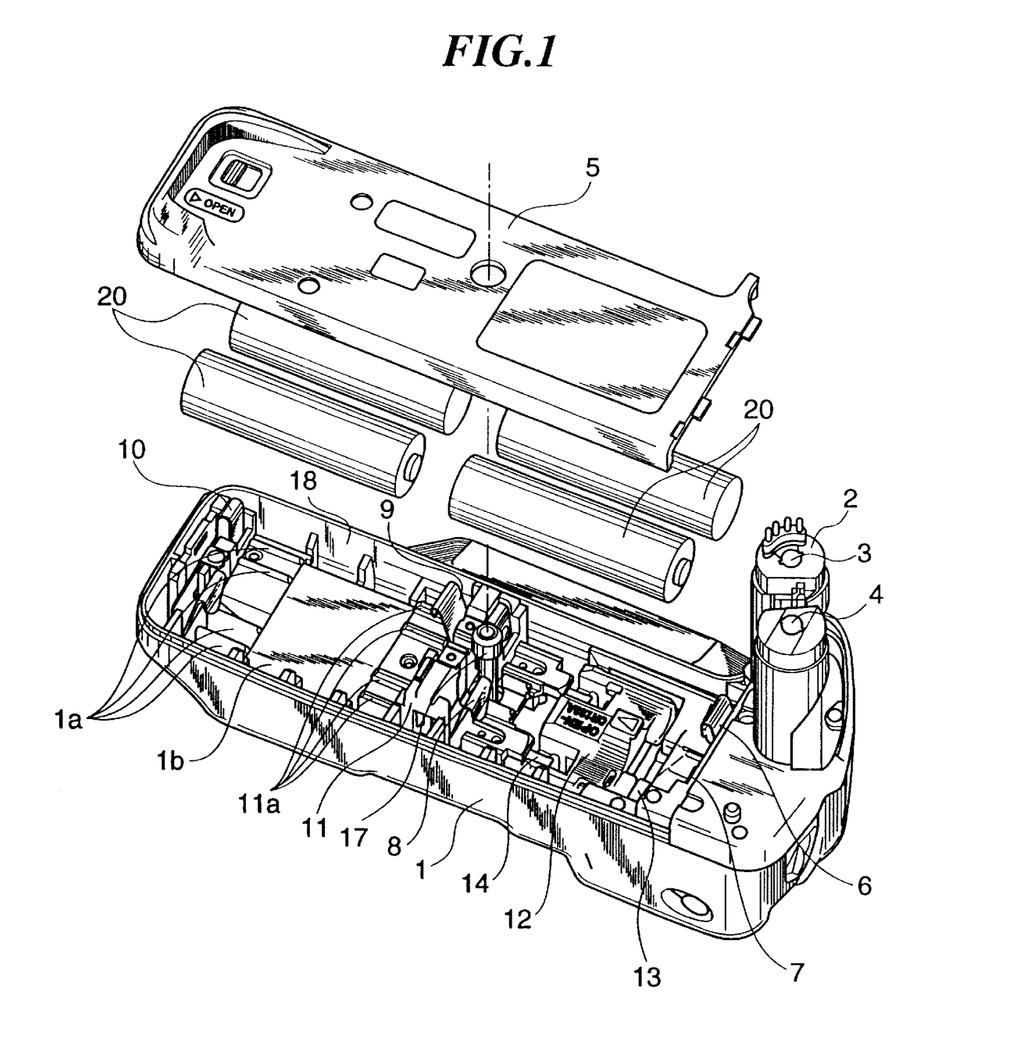
FIG. 1 is a perspective view showing a power source pack for a camera, as a battery storage case according to an embodiment of the present invention, in a state for accommodation of AA batteries.

The present invention will now be described in detail with reference to the drawings showing an embodiment thereof. FIG. 1 is a perspective view showing a power source pack for a camera, as a battery storage case according to the present invention, for accommodating different types of batteries. The illustrated battery storage case has a battery-receiving section 18 with a battery cover 5 removed therefrom, which is in a state for receiving four AA batteries 20 which correspond to first batteries in claims appended hereto.

The power source pack as a battery storage case according to the present embodiment is adapted to be rigidly fixed to a camera body, not shown, by operating a knob, not shown, to fasten a fitting male screw 17 protruding from the battery cover 5 into a female screw, not shown, formed in a tapped hole for tripod on the bottom surface of the camera body. Then, a funnel portion 2 projecting upward from the body of the power source pack is inserted into a battery chamber, not shown, in the camera body, whereby each of connection terminals 3, 4 attached to the tip of the funnel portion 2 is brought into contact with a power source terminal, not shown, mounted in the battery chamber of the camera body.

The battery-receiving section 18, which is mainly defined by an exterior casing 1, has shared terminals 6, 7 mounted therein at an end thereof close to the funnel portion 2, and end terminals 10, 10 at an opposite end thereof remote from the shared terminals 6, 7. An intermediate contact seat 11 is rigidly fixed to a central portion of the battery-receiving section 18 between the shared terminals 6, 7 and the end terminals 10, 10 and has intermediate contacts 8, 9 attached thereto. Further, the battery-receiving section 18 has rails 1a and 11a integrally formed therewith in the vicinity of the end terminals 10 and on opposite sides of the intermediate contact seat 11, respectively, for supporting undersides of outer shells of the AA batteries 20.

The AA batteries 20 accommodated in the battery-receiving section 18 in two rows are connected in series to each other by using the intermediate contacts 8, 9 and the end terminals 10. The output power from the batteries connected in series is taken out from the shared terminals 6, 7, and supplied to the camera through the above connection terminals 3, 4 which are electrically connected to the power source terminals in the battery chamber of the camera body.

Further, it can be seen from FIG. 1 that when the AA batteries 20 are received in the battery-receiving section 18, a terminal base 12 and a stage 13, both of which will be referred to hereinafter, are positioned between the intermediate contact seat 11 and the shared terminals 6, 7 in a state shown in the figure.

Figure 2:
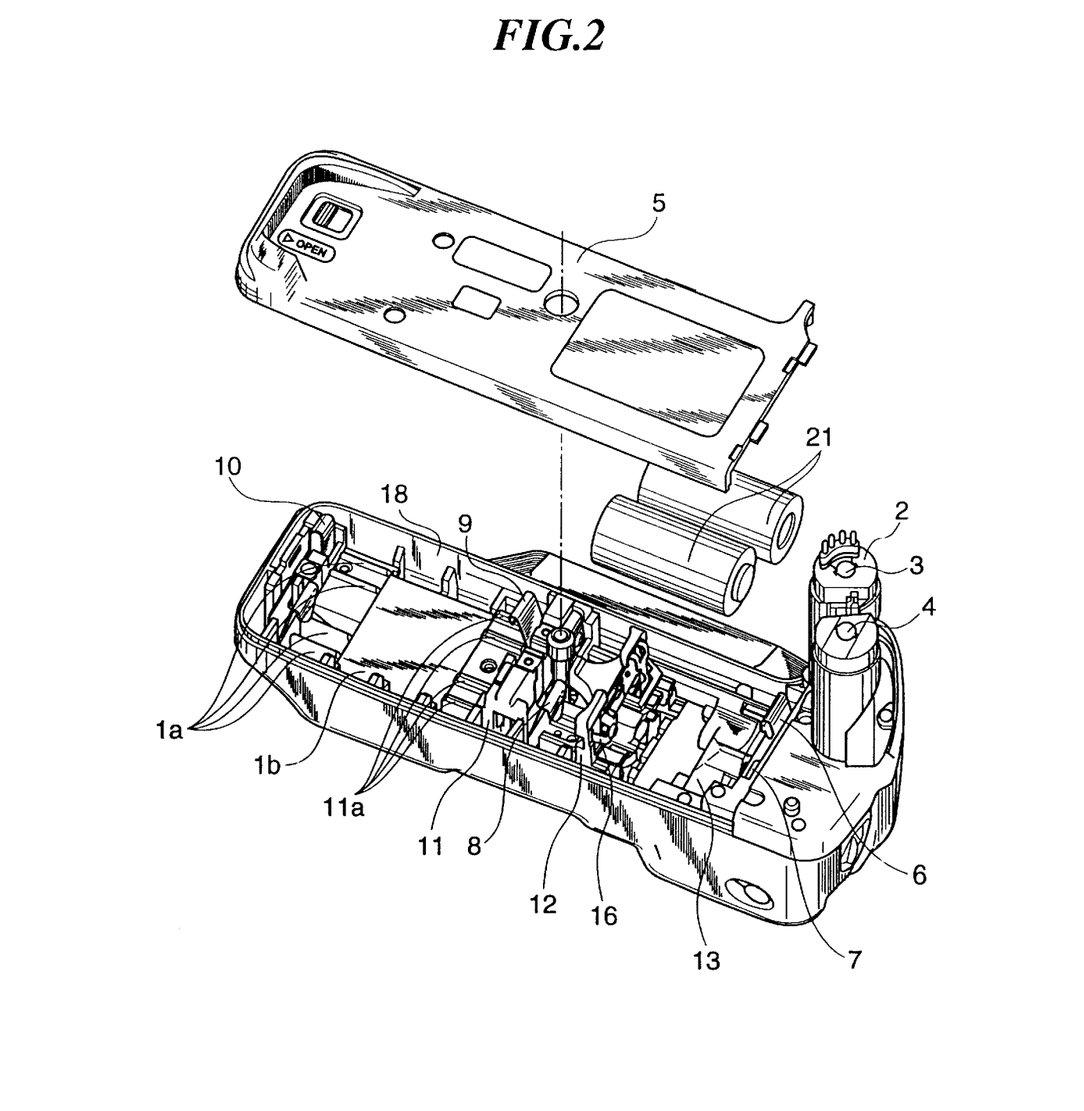
FIG. 2 is a perspective view showing the power source pack in a state for accommodation of lithium batteries.

FIG. 2 is a perspective view showing the power source pack as the battery storage case according to the present embodiment in a state for accommodating two lithium battery cells (hereinafter referred to as "lithium batteries") 21 which correspond to second batteries recited in claims appended hereto.

When the terminal base 12 is raised into an upright position, movable terminals 16 rigidly attached to the terminal base 12 appear or become visible between the shared terminals 6, 7 and the intermediate contacts 8, 9. The two lithium batteries 21 are received between these movable terminals 16 and the shared terminals 6, 7, and are connected in series to each other by means of the movable terminals 16. Similarly to the case of the AA batteries, the output power from the batteries connected in series is taken out from the shared terminals 6, 7 is supplied to the camera.

Figure 3:
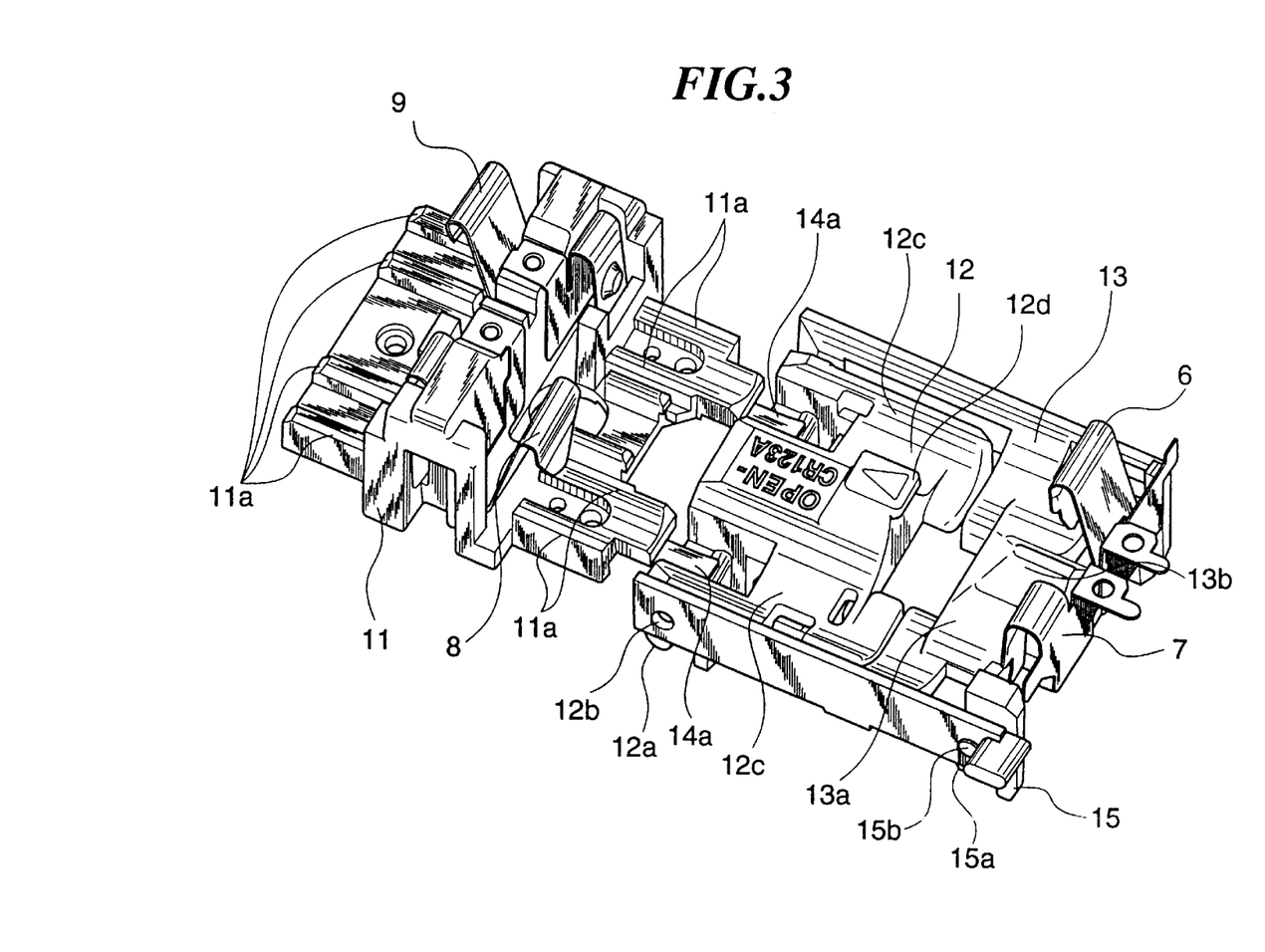
FIG. 3 is a perspective view showing main component parts of the power source pack, which enable accommodation of the AA batteries.
Figure 4:
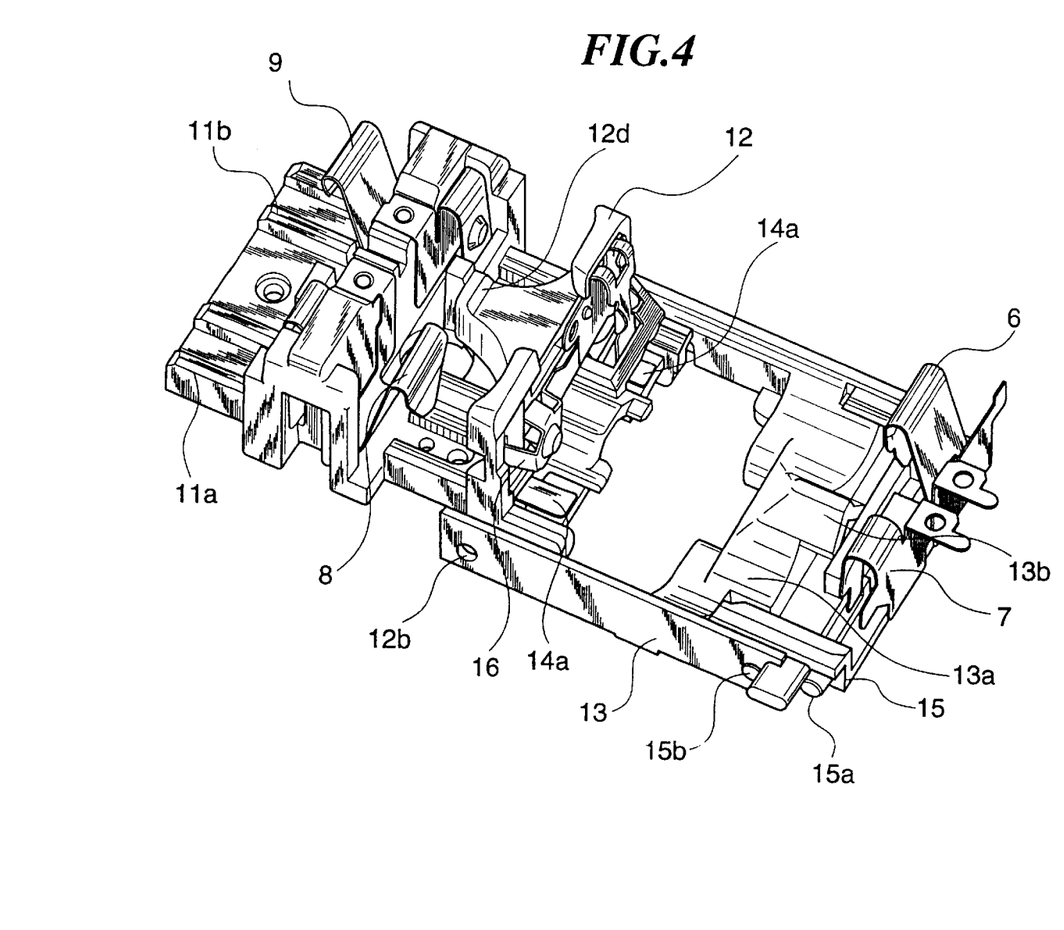
FIG. 4 is a perspective view showing main component parts of the power source pack, which enable accommodation of the lithium batteries.
Figure 5:
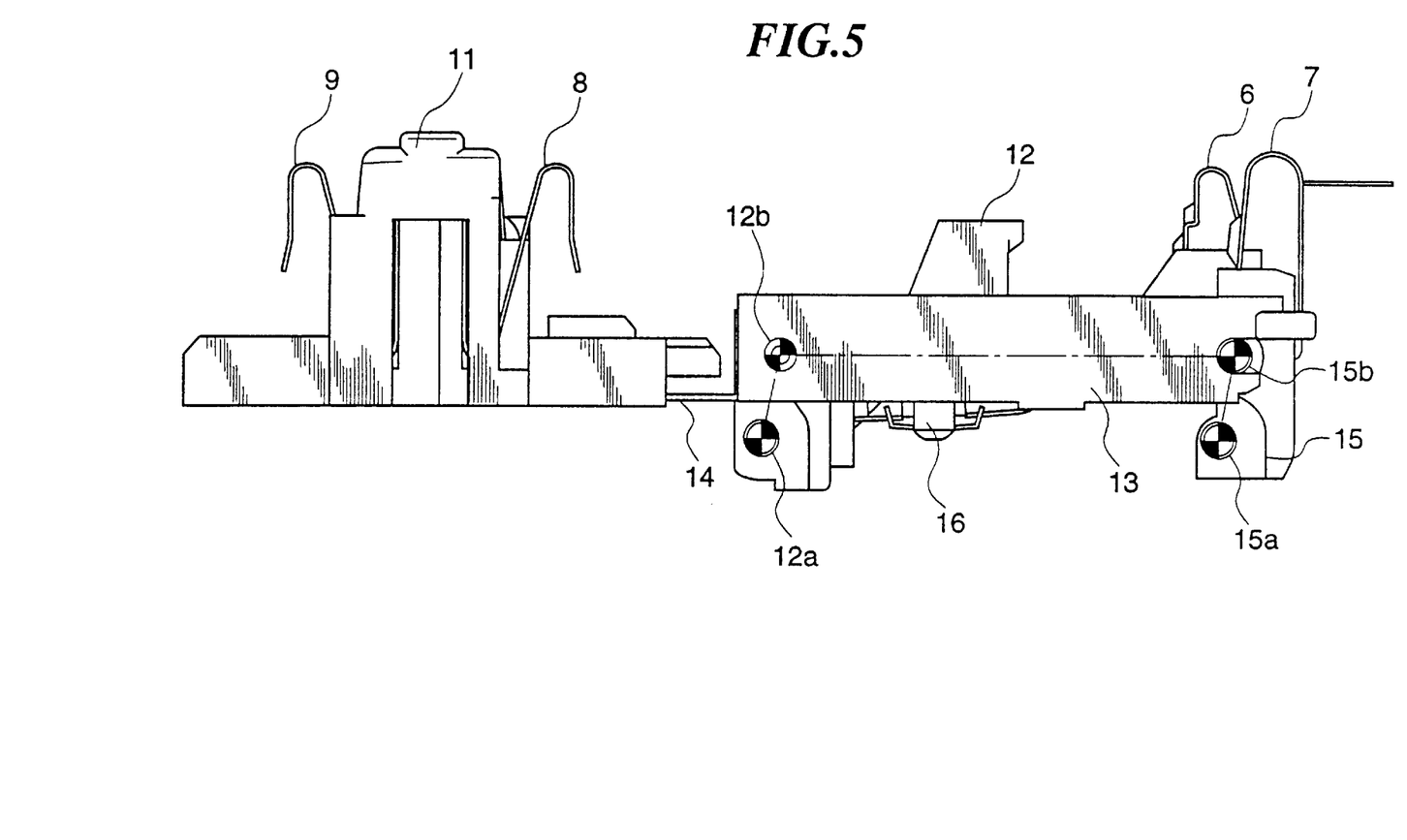
FIG. 5 is a side view showing the main component parts of the power source, which enable accommodation of the AA batteries.
Figure 6:
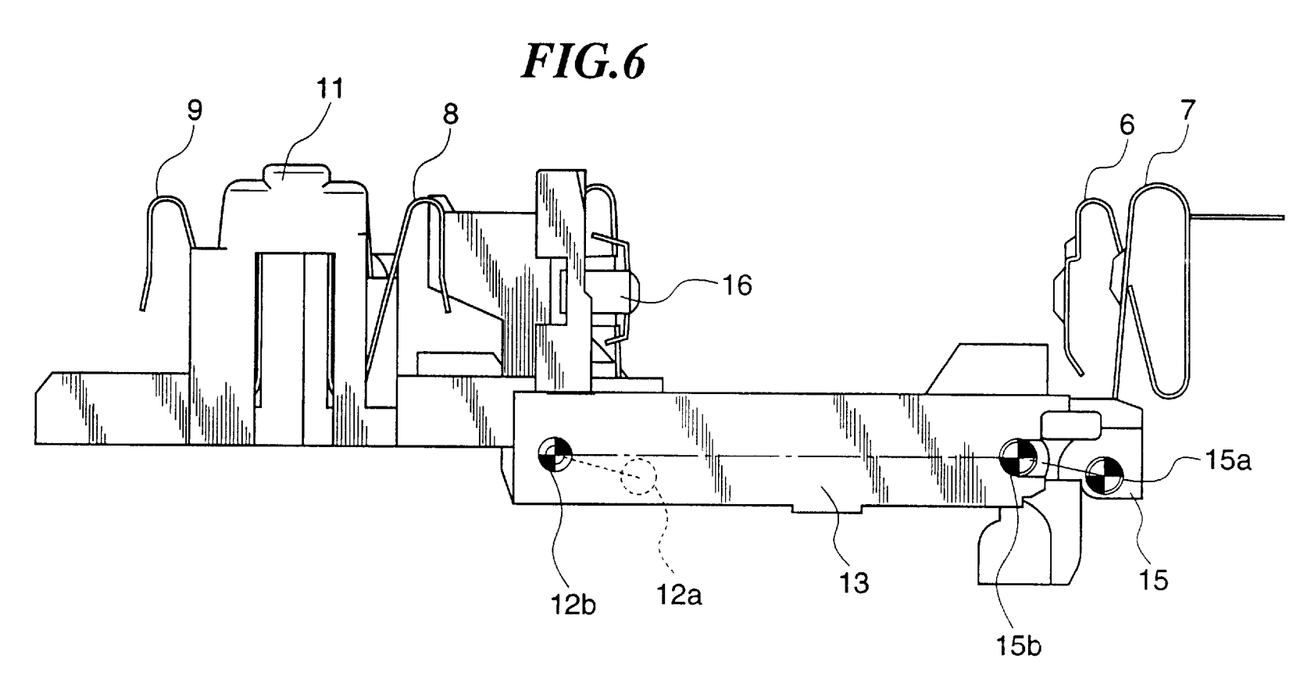
FIG. 6 is a side view showing the main component parts of the power source pack, which enable accommodation of the lithium batteries.

FIGS. 3 to 6 are perspective views and side views corresponding to FIGS. 1 and 2, respectively, and showing main component parts of the power source pack according to the present embodiment. Of the figures, FIG. 3 and FIG. 5 show the state of the power source pack for accommodating the AA batteries 20, while FIGS. 4 and 6 show the state of the power source pack for accommodating the lithium batteries 21.

The terminal base 12 has pivots 12a formed on opposite lateral sides thereof and supported on bearings, not shown, integrally formed with the exterior casing 1. The terminal base 12 is held in a pivotally movable manner by the urging forces of two arm portions 14a of a click plate 14 held between the exterior casing 1 and the intermediate contact seat 11 rigidly fixed to the exterior casing 1. The stage 13 has one end thereof rotatably fitted on connecting shafts 12b formed on the terminal base 12 in parallel with the pivots 12a. In the vicinity of the shared terminals 6, 7, an auxiliary link 15 is arranged for pivotal movement about shafts 15a which are supported on respective bearings, not shown, integrally formed with the exterior casing 1. The auxiliary link 15 has connecting shafts 15b formed thereon, on which are rotatably fitted the other end of the stage 13. In other words, as shown in FIGS. 5 and 6, the terminal base 12, the stage 13, and the auxiliary link 15 cooperate to form a translation link mechanism that permits the stage 13 to perform a vertical translation as the terminal base 12 is pivotally moved.

Although in the present embodiment, the pivotal auxiliary link 15 is employed, it goes without saying that one end of the stage 13 coupled to the auxiliary link 15 may form a sliding pair having a predetermined cam face together with the auxiliary link 15 to provide a similar motion of the stage 13.

Figure 7A:
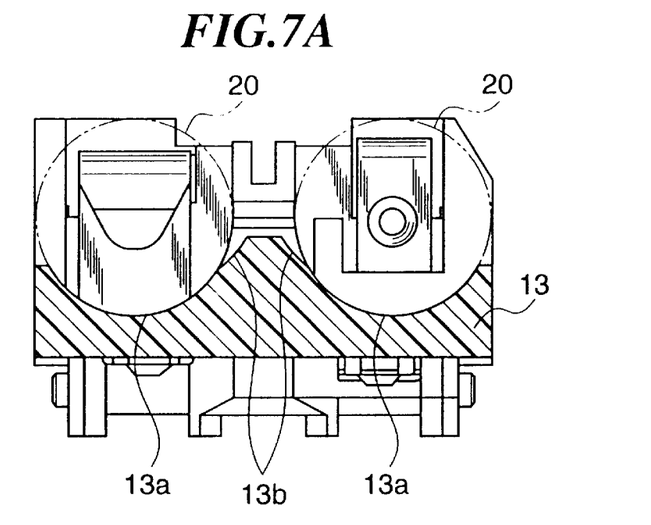
FIGS. 7A and 7B are cross-sectional views of stages for receiving the respective batteries.
Figure 7B:
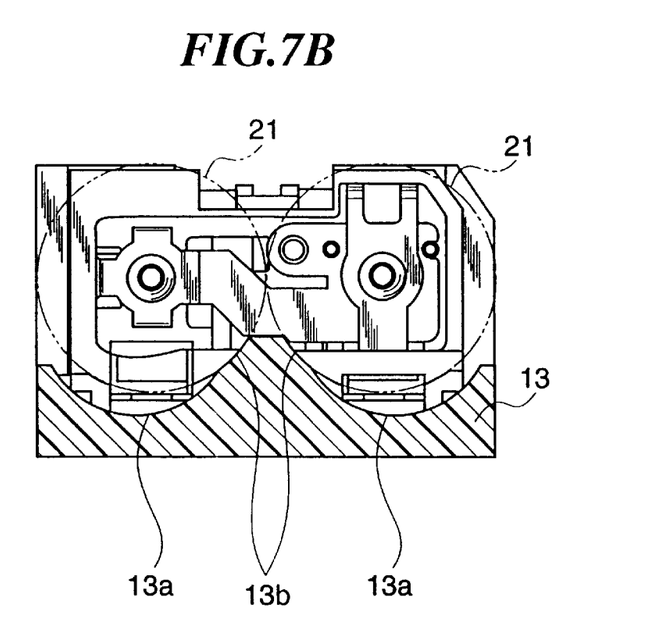

A vertical shift in the position of the stage 13 by the above translation sets the stage 13 into positions selectively supporting different types of batteries, i.e. AA batteries 20 and lithium batteries 21, which have respective different outer shell diameters. FIG. 7A is a cross-sectional view showing the stage 13 with the AA batteries 20 supported thereon, and FIG. 7B is a cross-sectional view showing the stage 13 with the lithium batteries 21 supported thereon. The stage 13 is integrally formed with two supporting curved surfaces 13a and two supporting curved surfaces 13b. When the AA batteries 20 are received in the battery-receiving section 18, the supporting curved surfaces 13a are brought into an appropriate position for supporting the batteries, while when the lithium batteries 21 are mounted, the supporting curved surfaces 13b are brought into an appropriate position for supporting the batteries, through vertical shift of the stage 13, thereby enabling the supporting curved surfaces 13a or 13b associated with the received batteries to abut on the outer shells of the batteries to support the same. It should be noted that the respective lateral outer side surfaces of the batteries are supported by the exterior casing 1, not shown in FIGS. 7A and 7B.

The terminal base 12 has curved surfaces 12c formed on a side thereof opposite to a side thereof to which the movable terminals 16 are rigidly attached. The curved surfaces 12c cooperate with the supporting curved surfaces 13a to serve the same purpose, i.e. support the batteries. When the AA batteries 20 are received in the power source pack, the terminal base 12 is in a position in which the movable terminals 16 face downward, and the curved surfaces 12c form a face flush and continuous with the supporting curved surfaces 13a of the stage 13 which is then shifted upward, thereby providing a space for accommodating the AA batteries 20.

To load the lithium batteries 21, the user has only to push up a finger catch portion 12d of the terminal base 12 with his finger to rotate the terminal base 12 through 90 degrees and bring the same into its upright position. In this case, the terminal base 12 protruding or extending into the space for accommodating the AA batteries, the movable terminals 16, and the stage 13 shifted downward provide a space for accommodating the lithium batteries 21.

Although a part of the space for accommodating the AA batteries provided between the intermediate contacts 8, 9 and the end terminals 10, 10 is not used when the lithium batteries are loaded, the power source pack according to the present embodiment allows utilization of this unused space as a storage section for storing spare lithium batteries.

Figure 8:
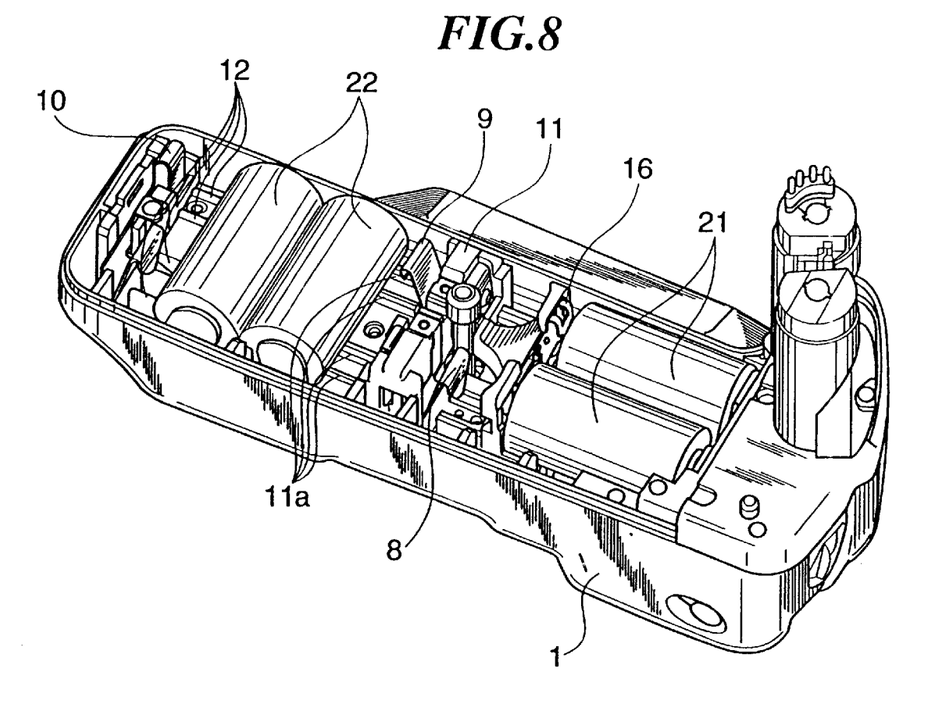
FIG. 8 is a perspective view of the power source pack in a state having spare lithium batteries received therein.
Figure 9:
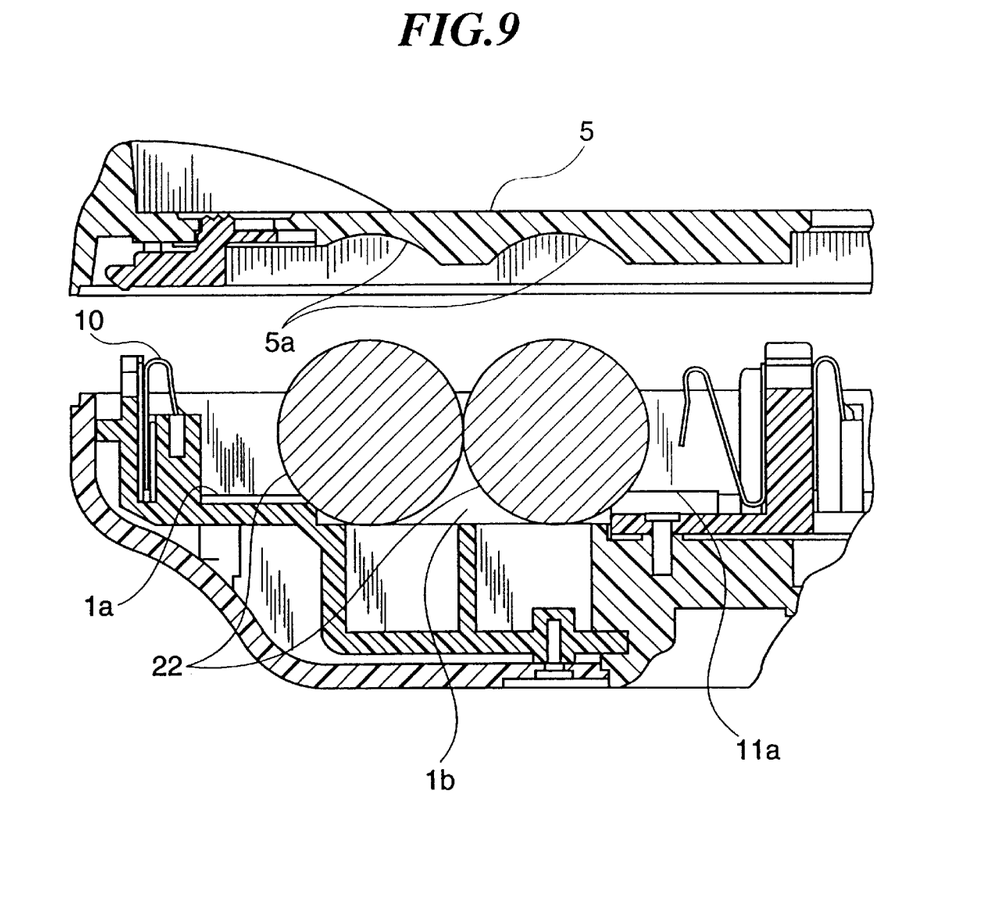
FIG. 9 is a cross-sectional view of the power source pack in the state having spare lithium batteries received therein.

FIG. 8 is a perspective view showing the power source pack with spare lithium batteries 22 received therein, and FIG. 9 is a cross-sectional view showing the power source pack with the lithium batteries 22 received therein. In this case, the two lithium batteries 22 are received in a recess 1b between the rails 1a and 11a in a direction at right angles relative to the direction in which the lithium batteries are normally received for use. Further, the battery cover 5 has an inner surface formed with curved surfaces 5a for holding the outer shells of the stored spare lithium batteries 22, which prevents undesired chattering of the batteries 22.

Although in the present embodiment, AA batteries and lithium battery cells are used, this is not limitative, but various combinations of batteries of different types with various shapes may be used with the battery storage case according to the present invention, and accordingly battery storage cases of various configurations meeting such combinations may be provided. Further, the battery storage case according to the present invention can be applied not only to cameras but also to various kinds of apparatuses using batteries.

What is claimed is:

1. A battery storage case comprising:
    a) a receiving section for receiving a plurality of first batteries that provide a predetermined voltage; and
    b) a battery cover for closing said receiving section; and
    wherein said receiving section has a space for accommodating the plurality of first batteries, said space having a first part for accommodating a smaller number of second batteries than a number of the first batteries, that provide the predetermined voltage, and a second part that forms a free space in said receiving section when the second batteries are received in said receiving section,
    said second part being used for accommodating spare batteries for the second batteries.

2. A battery storage case according to claim 1, wherein the spare batteries have outer shells, and wherein said battery cover has inner curved surfaces being designed to conform a shape of the outer shells of the spare batteries.

3. A battery storage case according to claim 1, further comprising movable terminals that are movable into a position in which said movable terminals are positioned inside said receiving section, to hold the second batteries in contact therewith when the second batteries are received in said receiving section.

4. A battery storage case, comprising:
    a receiving section for receiving a plurality of first batteries,
    said receiving section having a space for accommodating the plurality of first batteries, said space having a part for accommodating second batteries shorter in whole length than the first batteries; and
    movable terminals that are moveable into a first position in which said space is expanded when the first batteries are received in said receiving portion, and into a second position in which said space is contracted and said moveable terminals are positioned to hold the second batteries in contact therewith when the second batteries are received in said receiving section.

5. A battery storage case according to claim 4, further comprising a pivotally movable terminal base to which said movable terminals are attached, and a stage connected to said terminal base and extending longitudinally of batteries received in said receiving section, at least said terminal base and said stage forming a translation link mechanism allowing said stage to perform a translation in a direction radial of the batteries received in said receiving section when said terminal base is pivotally moved to bring said movable terminals into said first position for permitting the first batteries to be received in said receiving section or to bring said movable terminals into said second position for permitting the second batteries to be received in said receiving section.

6. A battery storage case according to claim 5, wherein the first batteries and the second batteries have outer shells, and wherein said stage has first surfaces formed thereon for being brought into contact with the outer shells of the first batteries when said movable terminals are in the first position, and second surfaces formed thereon for being brought into contact with the outer shells of the second batteries when said movable terminals are in the second position.

* * * * *